(12) United States Patent
Sud et al.

(10) Patent No.: US 8,589,410 B2
(45) Date of Patent: Nov. 19, 2013

(54) VISUAL SEARCH USING MULTIPLE VISUAL INPUT MODALITIES

(75) Inventors: Avneesh Sud, Kirkland, WA (US); Rajeev Prasad, Bothell, WA (US); Ayman Malek Abdel Hamid Kaheel, Bellevue, WA (US); Pragyana Mishra, Bellevue, WA (US); Sumit Amar, Surrey (CA); Kancheng Cao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/301,381

(22) Filed: Nov. 21, 2011

(65) Prior Publication Data

US 2013/0097181 A1    Apr. 18, 2013

Related U.S. Application Data

(60) Provisional application No. 61/548,585, filed on Oct. 18, 2011.

(51) Int. Cl.
 *G06F 17/30* (2006.01)
(52) U.S. Cl.
 USPC ............................ 707/748; 707/755; 707/769
(58) Field of Classification Search
 USPC .......................................................... 707/748
 See application file for complete search history.

(56) References Cited

U.S. PATENT DOCUMENTS

| 2003/0179213 | A1* | 9/2003 | Liu ................................ 345/619 |
| 2004/0215660 | A1* | 10/2004 | Ikeda ......................... 707/104.1 |
| 2005/0055344 | A1 | 3/2005 | Liu et al. |
| 2007/0133947 | A1* | 6/2007 | Armitage et al. ................ 386/95 |
| 2008/0097975 | A1 | 4/2008 | Guay et al. |
| 2010/0017389 | A1 | 1/2010 | Ogunbona et al. |
| 2010/0195914 | A1* | 8/2010 | Isard et al. ..................... 382/201 |
| 2011/0125735 | A1 | 5/2011 | Petrou |
| 2011/0167053 | A1 | 7/2011 | Lawler et al. |
| 2012/0054177 | A1* | 3/2012 | Wang et al. .................... 707/723 |

OTHER PUBLICATIONS

Bundling Features for Large Scale Partial-Duplicate Web Image Search http://vc.cs.nthu.edu.tw/home/paper/codfiles/chyu/200906300559/Bunlded_CVPR2009.pdf.
Like.com; http://www.like.com; last accessed Sep. 19, 2011; 2 pages.

(Continued)

*Primary Examiner* — Binh V Ho
(74) *Attorney, Agent, or Firm* — Shook, Hardy & Bacon L.L.P.

(57) ABSTRACT

Systems, methods, and computer-readable storage media for web-scale visual search capable of using a combination of visual input modalities are provided. An edgel index is created that includes shape-descriptors, including edgel-based representations, that correspond to each of a plurality of images. Each edgel-based representation includes pixels that depicts edges or boundary contours of an image and is created, at least in part, by segmenting the image into a plurality of image segments and performing a multi-phase contour detection on each segment. Upon receiving a search query having a visual query input, the visual query input is converted into shape-descriptors, including an edgel-based representation, and the shape-descriptors, including the edgel-based representation, of each of the plurality of images is compared with the shape-descriptors, including the edgel-based representation, of the visual query input to identify at least one image of the plurality of images that matches the visual query input.

17 Claims, 10 Drawing Sheets

(56) References Cited

OTHER PUBLICATIONS

Tineye; http://www.tineye.com; last accessed Sep. 11, 2011; 2 pages.
Yang Cao, Hai Wang, Changhu Wang, Zhiwei Li, Liqing Zhang and Lei Zhang, MindFinder: Interactive Sketch-based Image Search on Millions of Images, in ACM Multimedia 2010 International Conference, 2010; 4 pages.
Cao, et al., "Edgel Index for Large-Scale Sketch-based Image Search", In Proceedings of IEEE International Conference on Computer Vision and Pattern Recognition, Jun. 20-25, 2011, pp. 761-768.
Suditu, Nicolae, "Multimodal Relevance Feedback for Interactive Image Retrieval", Submitted to Doctoral program in Electrical Engineering, PhD. Thesis Proposal, Jun. 2010, 22 pages.
Xu, et al., "Interactive Image Search by 2D Semantic Map", In Proceedings of the 19th International Conference on World Wide Web, Apr. 26-30, 2010, pp. 1321-1324.
Eitz, et al., "Photosketcher: Interactive Sketch-based Image Synthesis", In Proceedings of IEEE Computer Graphics and Applications, vol. PP, Issue 99, Jul. 22, 2011, pp. 1-1.
Ortega-Binderberger, et al., "WebMARS: A Multimedia Search Engine", In Proceedings of SPIE Electronic Imaging: Internet Imaging, vol. 3964, Jan. 26, 2000, pp. 314-321.
Bezerra, et al., "Client-Side Content-Based Refinement for Image Search in the Web", In Proceedings of the 11th Brazilian Symposium on Multimedia and the Web, 2005, pp. 1-3.
Noah, et al., "Binding Semantic to a Sketch Based Query Specification Tool", In the International Arab Journal of Information Technology, vol. 6, Issue 2, Apr. 2009, pp. 116-123.
Like.com http://www.like.com/.
Tineye http://www.tineye.com/.
Yang Cao, Hai Wang, Changhu Wang, Zhiwei Li, Liqing Zhang, and Lei Zhang, MindFinder: Interactive Sketch-based Image Search on Millions of Images, in ACM Multimedia 2010 International Conference, 2010.
PCT International Search Report and Written Opinion mailed Mar. 29, 2013 in Application No. PCT/US2012/060908; 11 pages.

* cited by examiner

VISUAL SEARCH USING MULTIPLE VISUAL INPUT MODALITIES

CROSS-REFERENCE TO RELATED APPLICATIONS

This application claims the benefit of U.S. Provisional Patent Application Ser. No. 61/548,585 filed Oct. 18, 2011, which application is incorporated by reference as if set forth in its entirety herein.

BACKGROUND

The Internet, through its billions of Web pages, provides a vast and quickly growing library of information and resources. In order to find desired content, computer users often make use of search utilities. Exemplary Internet search engines are well known in the art, for instance, a commonly known commercial engine is the Bing® search engine provided by Microsoft Corporation of Redmond, Wash. Many current commercial image search technologies use textual queries to fetch results from a large database of crawled images that are primarily indexed by textual data. This limits the scope of what images can be searched, which in turn affects the quality and relevance of search results. In addition, usability is affected by lack of interactive refinement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, providing a unified system for web-scale visual search that is capable of using a combination of visual input modalities, such as a sketch, an image, or a collage. An edgel (i.e., edge pixel) index is created comprising edgel-based representations that correspond to each of a plurality of images. In embodiments, other shape-descriptors, such as gradient-based representations and/or histograms of gradients may also be included in the edgel index. Each edgel-based representation comprises a set of pixels that depicts one or more edges or boundary contours of an image and is created, at least in part, by segmenting the image into a plurality of image segments and performing a multi-phase contour detection on each segment. Upon receiving a search query having a visual query input (e.g., an image, a sketch, and/or a collage), the visual query input is converted into an edgel-based representation (for instance, using segmentation and multi-phase contour detection) and the edgel-based representation of each of the plurality of images is compared with the edgel-based representation of the visual query input to identify at least one image of the plurality of images that matches the visual query input. In embodiments, the visual query input may also be converted into one or more other shape-descriptions (e.g., gradient-based representations and/or histograms of gradients) and compared against like data included in the edgel index. In this way, the system of the present invention is configured to receive search queries via a variety of visual input modalities and to return image-based search results based upon the received input.

The unified system of embodiments of the present invention is capable of handling textual and multiple visual input modalities using a textual index structure and a single visual input index structure for matching against different visual inputs. Algorithms that improve both the result quality and performance, enabling fast indexing and visual search of millions of images are provided. Also provided is an intuitive, touch-friendly user experience that enables a user to flexibly formulate search queries using a combination of input modalities (e.g., text, image, sketch, and collage) and to switch between and combine different input modalities within the same search session. The user experience may include a search canvas or window that enables users to compose a complex query, such as by drawing a sketch, inputting an image, drawing or inputting a collage, and entering one or more textual keywords.

BRIEF DESCRIPTION OF THE DRAWINGS

The present invention is illustrated by way of example and not limited in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Visual search attributes have been shown to be among the key factors used when users search for certain items such as clothing. Generally, commercial search engines display product images along with search results. Further, visual inputs, such as rough sketches and color descriptors, are intuitive for users while searching for visual data such as images. Any search experience that leverages such natural modalities will be fun and easy to use. Consumer studies have shown the ability to refine the query using multiple input modalities leads to a more engaging experience, while enabling discovery and exploration. For instance, a user searching for a particular shoe of unknown brand/type may initiate a query using the textual input "shoes."

While browsing the results, the user may notice a shoe which looks similar to the desired one and then s/he may desire to refine the query via a "visually similar" query to find more shoes that have the same shape, color and texture. In addition, the user might wish to add a similar shoe to a sketch canvas and create a collage by sketching more details to further refine the query.

Accordingly, various aspects of the technology described herein are generally directed to systems, methods, and computer-readable storage media for, among other things, providing a unified system for web-scale visual search that is capable of using a combination of visual input modalities, such as a sketch, an image, or a collage. An edgel (i.e., edge pixel) index is created comprising edgel-based representations that correspond to each of a plurality of images. In embodiments, other shape-descriptors, such as gradient-based representations and/or histograms of gradients may also be included in the edgel index. Each edgel-based representation comprises a set of pixels that depicts one or more edges or boundary contours of an image and is created, at least in part, by segmenting the image into a plurality of image segments and performing a multi-phase contour detection on each segment. Upon receiving a search query having a visual query input (e.g., an image, a sketch, and/or a collage), the visual query input is converted into an edgel-based representation (for instance, using segmentation and multi-phase contour detection) and the edgel-based representation of each of the plurality of images is compared with the edgel-based representation of the visual query input to identify at least one image of the plurality of images that matches the visual query input. In embodiments, the visual query input may also be converted into one or more other shape-descriptors (e.g., gradient-based representations and/or histograms of gradients) and compared against like data included in the edgel index. In this way, the system of the present invention is configured to receive search queries via a variety of visual input modalities and to return image-based search results based upon the received input.

Accordingly, one embodiment of the present invention is directed to a system for providing a unified system for web-scale visual search that is capable of using a combination of visual input modalities. The system comprises a processor in communication with computer-readable storage media, and an index maintained in the computer-readable storage media. The index includes image data that describes edgel-based representations of each of a plurality of images. The system further comprises a query receiving component that receives a visual input (e.g., an image, a sketch, and/or a collage) as a search query, a query parser that converts the visual input into one or more shape descriptors, including an edgel-based representation thereof, and a visual input matching component that matches the one or more shape descriptors, including the edgel-based representations of the plurality of images, with the shape descriptors, including the edgel-based representation, of the visual input from the search query to identify at least one matching image of the plurality of images.

Another embodiment of the present invention is directed to one or more computer-readable storage media storing computer-useable instructions that, when used by one or more computing devices, cause the one or more computing devices to perform a method for providing a unified system for web-scale visual search that is capable of using a combination of visual input modalities. The method includes receiving a search query; providing a plurality of image results, each of the plurality of image results having one or more associated shape descriptors, including an edgel-based representation thereof; receiving a visual query refinement (e.g., an image, a sketch and/or a collage); converting the visual query refinement into one or more shape descriptors, including an edgel-based representation thereof; and comparing the shape descriptors, including the edgel-based representations, of the plurality of images with the shape descriptors, including the edgel-based representation, of the visual query refinement to identify at least one refinement-matching image of the plurality of image results.

In yet another embodiment, the present invention is directed to a method for providing a unified system for web-scale visual search that is capable of using a combination of visual input modalities. The method includes accessing a plurality of images, segmenting each of the plurality of images into a respective plurality of segments, performing a multi-phase contour detection on each respective plurality of segments to create one or more shape descriptors of each of the plurality of images, including an edgel-based representation, and generating, by a processor, an edgel index comprising image data that describes the respective shape descriptors, including the edgel-based representations of each of the plurality of images. In embodiments, each edgel-based representation comprises a set of pixels that depicts one or more boundary contours of each of the plurality of images. The method may further include receiving a search query, the search query comprising a visual input (e.g., an image, a sketch, and/or a collage), converting the visual query input into one or more shape descriptors, including an edgel-based representation, and comparing the shape descriptors, including the edgel-based representations of each of the plurality of images, with the shape descriptors, including the edgel-based representation of the visual query input, to identify at least one image of the plurality of images that matches the visual query input.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 1:
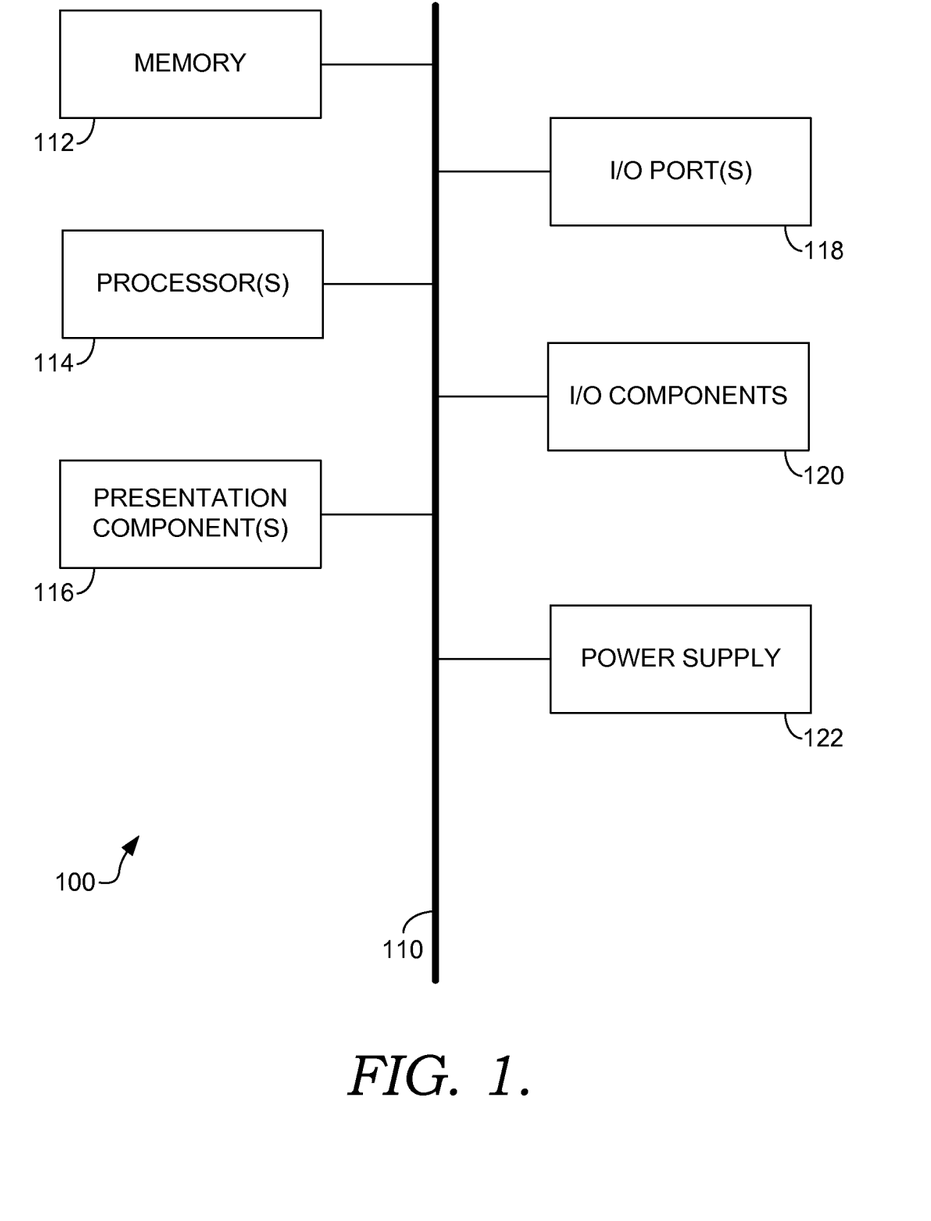
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, embodiments of the present invention are generally directed to systems, methods, and computer-readable storage media for, among other things, providing a unified system for web-scale visual search that is capable of using a combination of visual input modalities, such as a sketch, an image, or a collage. An exemplary sketch-only image search technique is described in application Ser. No. 12/873,007, filed Aug. 31, 2010 and entitled "Sketch-based Image Search" and an exemplary image-based search technique is described in U.S. Application Publication No. 2010/0195914, published Aug. 5, 2010 and entitled "Scalable Near Duplicate Image Search with Geometric Constraints," both of which are incorporated by reference as if set forth in their entirety herein.

In accordance with embodiments hereof, an edgel (i.e., edge pixel) index is created comprising edgel-based representations that correspond to each of a plurality of images. In embodiments, other shape-descriptors, such as gradient-based representations and/or histograms of gradients may also be included in the edgel index. Each edgel-based representation comprises a set of pixels that depicts one or more edges or boundary contours of an image and is created, at least in part, by segmenting the image into a plurality of image segments and performing a multi-phase contour detection on each segment. Upon receiving a search query having a visual query input (e.g., an image, a sketch, and/or a collage), the visual query input is converted into an edgel-based representation (for instance, using segmentation and multi-phase contour detection) and the edgel-based representation of each of the plurality of images is compared with the edgel-based representation of the visual query input to identify at least one image of the plurality of images that matches the visual query input. In embodiments, the visual query input may also be converted into one or more other shape-descriptors (e.g., gradient-based representations and/or histograms of gradients) and compared against like data included in the edgel index.

Figure 2:
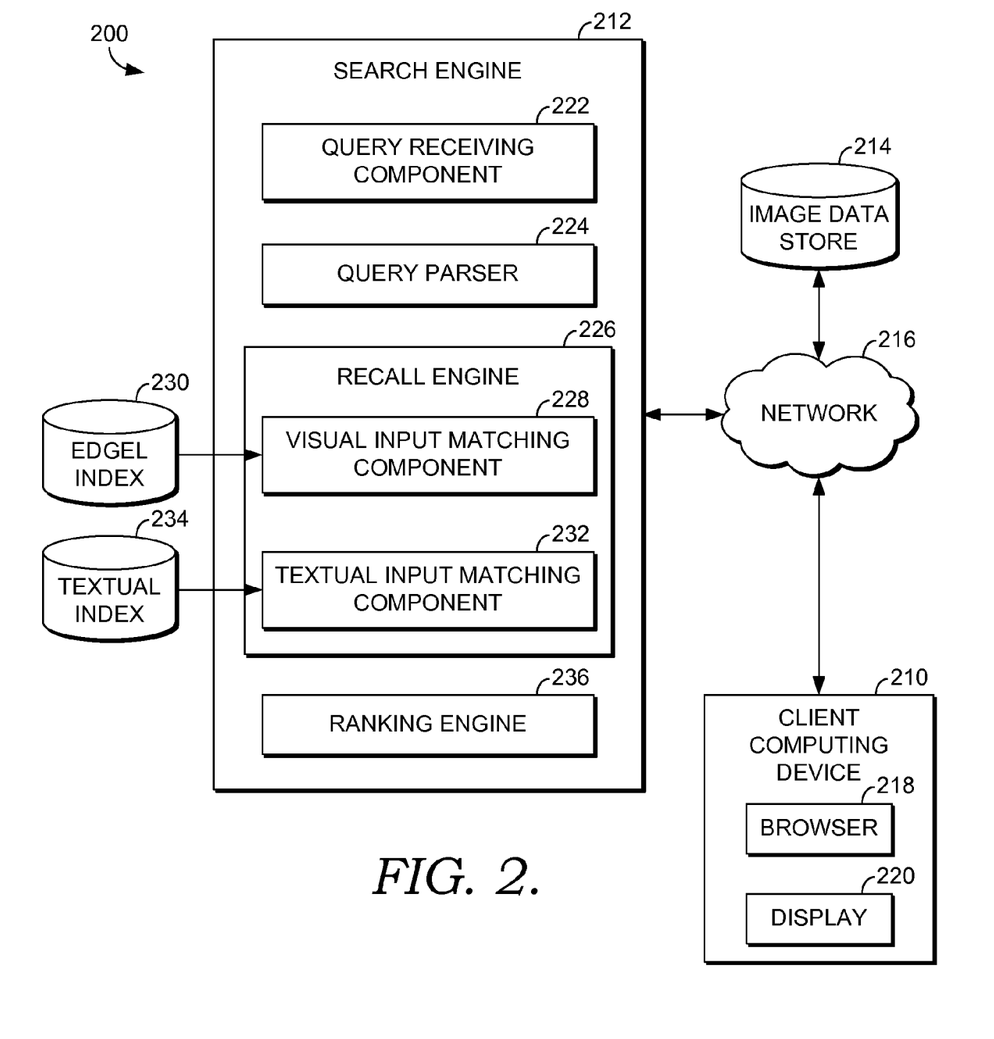
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which a unified system for web-scale visual search that is capable of using a combination of visual input modalities (e.g., an image, a sketch, and/or a collage) is enabled. As will be described in further detail below, embodiments of the present invention provide systems and methods for enabling such a web-scale visual search system by creating an index of shape-descriptors, including edgel-based image representations, against which edgel-based representations (and other shape-descriptors) of visual inputs may be compared and matched. In this way, the system 200 is configured to receive search queries via a variety of visual input modalities and to return image-based search results based upon the received input.

Among other components not shown, the computing system 200 generally includes a client computing device 210, a search engine 212, and an image data store 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of client computing devices, search engines and image data stores may be employed in the computing system 200 within the scope of embodiments of the present invention. Each may comprise a single device/interface or multiple devices/interfaces cooperating in a distributed environment. For instance, the search engine 212 may comprise multiple devices and/or modules arranged in a distributed environment that collectively provide the functionality of the search engine 212 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client device 210, as an Internet-based service, or as a module inside the search engine 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines or user computing devices. By way of example only, the search engine 212 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 210 may include any type of computing device, such as the computing device 100 described with reference to FIG. 1, for example. Generally, the client computing device 210 includes a browser 218 and a display 220. The browser 218 is configured to render a search engine home page in association with the display 220 of the client computing device 210. The browser 218 is further configured to receive user input of requests for various web pages (including search engine home pages), receive user inputted search queries (generally inputted via a user interface presented on the display 220 and permitting alpha-numeric, textual and/or visual input into a designated search input area) and to receive content for presentation on the display 220, for instance, from the search engine 212. The browser 218 may be any suitable type of web browser such as Internet Explorer®, Firefox®, Chrome®, Safari®, or other type of software configured to enable submission of textual and/or visual search queries for a search as disclosed herein. It should be noted that the functionality described herein as being performed by the browser 218 may be performed by any other application capable of rendering Web content. Any and all such variations, and any combination thereof, are contemplated to be within the scope of embodiments of the present invention.

The display 220 is configured to present various content including search engine home pages having a designated search input area and search engine results pages having textual and/or image results as described herein. In embodiments, the display 220 is further configured to enable touch inputs from a user.

The search engine 212 is configured to receive and respond to requests that it receives from components associated with client computing devices, for instance, the browser 218 associated with the client computing device 210. Those skilled in the art of the present invention will recognize that the present invention may be implemented with any number of searching utilities. For example, an Internet search engine or a database search engine may utilize the present invention. These search engines are well known in the art, and commercially available engines share many similar processes not further described herein.

The search engine 212 utilizes, for instance, bitmap-based similarity matching and includes a query parsing component which can handle various visual inputs (including images, sketches and collages), use of orientation, color and Euclidean chamfer distance for computing similarity between two shape descriptors (e.g., edgel-based representations), and memory-efficient edgel-representation and index layouts providing improved cache performance and parallel algorithms for recall and ranking to improve query latency and queries-per-second throughout. Accordingly, as illustrated, the search engine 212 includes a query receiving component 222, a query parser 224, a recall engine 226 (having a visual input matching component 228 and a textual input matching component 232), and a ranking engine 236. The illustrated search engine 212 also has access to an image data store 214. The image data store 214 is configured to store image data, that is, information associated with images. In various embodiments, such information may include, without limitation, raw image data, optimized image data, and the like. In embodiments, the image data store 214 is configured to be searchable for one or more of the items stored in association therewith. It will be understood and appreciated by those of ordinary skill in the art that the information stored in association with the image data store 214 may be configurable and may include any information relevant to images configured for presentation on a search engine results page, including text associated therewith. The content and volume of such information are not intended to limit the scope of embodiments of the present invention in any way. Further, though illustrated as a single, independent component, the image data store 214 may, in fact, be a plurality of storage devices, for instance a database cluster, portions of which may reside in association with the search engine 212, the client computing device 210, another external computing device (not shown), and/or any combination thereof.

The query receiving component 222 of the search engine 212 is configured to receive search queries, for instance, search queries input via the client computing device 210. An input search query may include textual input and/or visual input (e.g., an image, a sketch, and/or a collage). The query receiving component 222 is further configured to receive textual and/or visual query refinements, as more fully described below.

The query parser 224 is configured to determine whether an input query includes multiple modalities (e.g., text and/or visual modalities) and, if so, to extract and separate the textual input from the visual input. The query parser is further configured to transmit textual queries or textual input from a multi-modal query to a textual search index (e.g., textual index 234) for identification of search results that match or satisfy the input textual query, for instance, in cooperation with the textual input matching component 232, as more fully described below. Still further, the query parser is configured to convert visual queries or visual input from a multi-modal query to an edgel-based representation using a schema similar to the image processing and indexing component 310 more fully described below with reference to FIG. 3. For sketch-based queries, the user strokes are treated as the salient contours and edgel orientation is computed. For image queries, the salient contours are extracted using the approach described with reference to FIG. 3 below. For collage queries, the user strokes and individual image edgel-based representations are rasterized and composed into a single edgel-based representation (preserving the depth ordering). It should be noted that for query images which are already present in the edgel index, the indexing component 300 of FIG. 3 need not be executed. Instead, the stored edgel-based representation of the image may be utilized.

The recall engine 226 is configured to utilize the color and orientation encoded edgels from the salient contours of the visual inputs as keys into the inverted edgel index 230. To create the inverted edgel index 230, for each image in a corpus of images, one or more shape-descriptors are computed and indexed. Subsequently, when a query having a visual input (or a visual query) is received, the index may be scanned and a matching set of image shape-descriptors returned (from which the corresponding images may be retrieved, for instance, from the image data store 214). In accordance with embodiments hereof, at least one of the shape-descriptors of the images are described by the edgels or edge pixels. The edgels represent the salient contours and edges of the image which provide a reasonable approximation of the shape and high level texture detail in the image. Edgel representations of the images are then stored in association with the edgel index 230. The edgel index 230 is based on an inverted index structure. This index is computed by generating the edgel-based representation of an image, and using the position, orientation and color of each edge pixel (edgel) as the index key. Such an edgel index 230 scales well to a large plurality (e.g., millions) of images. As more fully described below, quantized color information is included in the egel index 230, enabling results to be ranked not just by the shape, but also by the color. Further, a multi-stage contour detection algorithm is utilized which extracts the salient contours of the foreground objects, and is able to robustly handle low contrast images (e.g., a white skirt with a white background). Still further, the edgel-based representation of the foreground object is converted into an affine normalized space which makes the edgel-based representation invariant to scale, translation, reflection and rotational changes. Creation of the inverted edgel index 230 is shown with reference to FIG. 3 which illustrates a block diagram of an exemplary indexing system 300 that may be employed with embodiments of the present invention.

Figure 3:
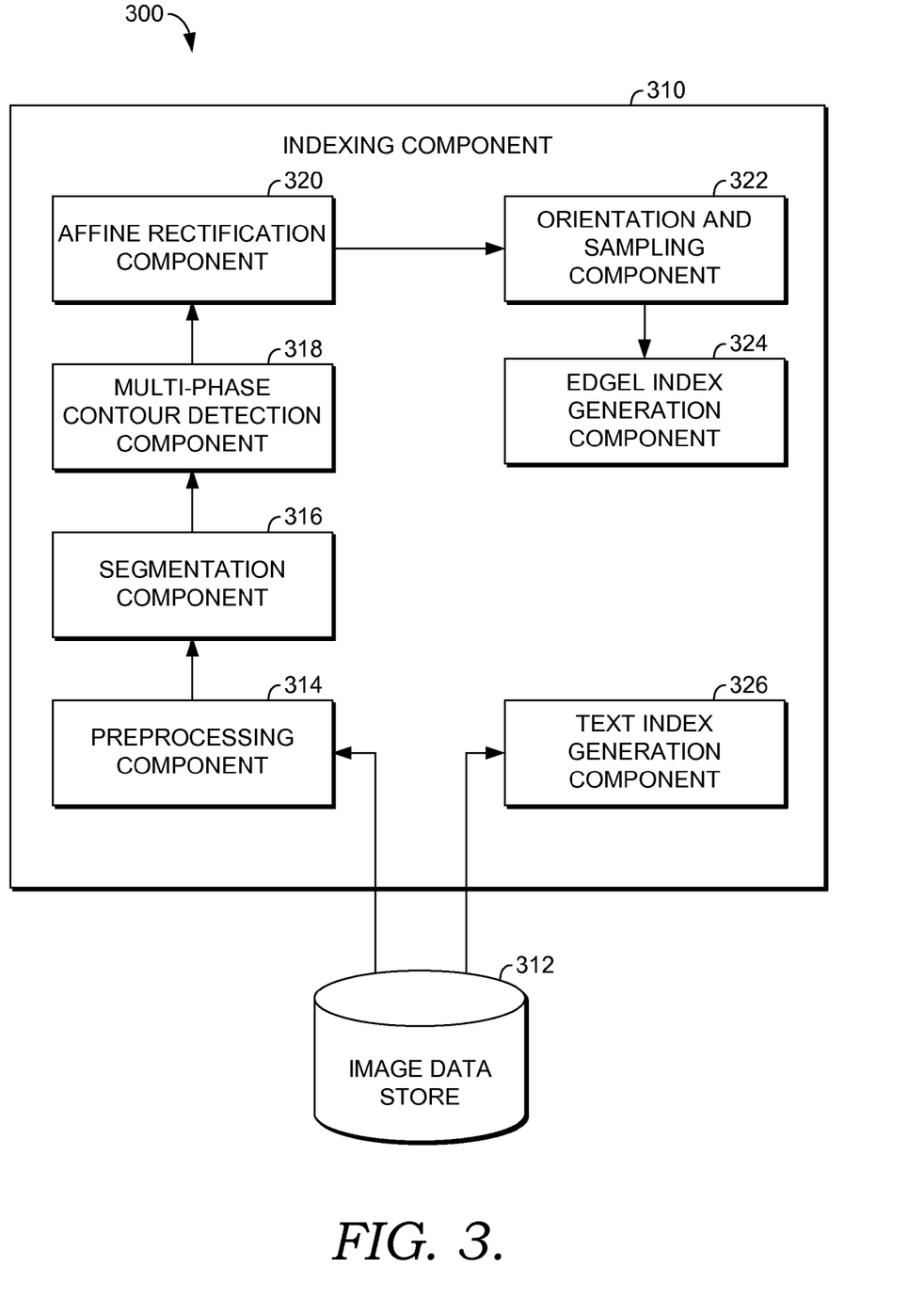
FIG. 3 is a block diagram of an exemplary indexing system in which embodiments of the present invention may be employed.

A corpus of images, for instance, images stored in association with an image data store 312 (e.g., the image data store 214 of FIG. 2) are accessed and transmitted to the indexing component 310. As illustrated, the indexing component 310 includes a preprocessing component 314, a segmentation component 316, a multi-phase contour detection component 318, an affine rectification component 320, an orientation and sampling component 322, an edgel index generation component 324 and a text index generation component 326. Each of these components is more fully described below.

The preprocessing component 314 is configured to resize each received image of the corpus of images into a standard size (e.g., 200×200 pixels). In embodiments, Gaussian smoothing may then be applied to the resized images to reduce noise artifacts. Gaussian smoothing is a technique well known in the art and, accordingly, is not further described herein.

The segmentation component 316 is configured to perform an efficient graph-cut segmentation on the received images based on color and gradient changes. In embodiments, techniques presented by Felzenszwalk & Huttenlocher in IJCV 2004 may be utilized. In order to keep salient edges, segments below a certain size may be combined with neighboring larger segments. Each segment may be assigned its mean color to give an image in a particular color space (e.g., an RGB color image) of principal segments in the image.

The multi-phase contour detection component 318 is configured to extract salient edges from the segments using a multi-phase approach. First, the strong edges from the segments are detected by converting the grayscale and, by way of example, running the Canny edge detector. The Canny edge detector is known to those of ordinary skill in the art and, accordingly, is not further described herein. In embodiments, in order to detect low-contrast edges, histogram equalization is applied over the low contrast regions and the Canny edge detector is run on the histogram-equalized image. Next, the low-contrast edges are scored based on proximity to strong edges and local gradients across the low-contrast edges. This approach tends to preserve low contrast edges which contribute to an object boundary, while eliminating low-contrast edges due to noise. The curvature of each contour is then computed and the background color information is utilized to eliminate background/border edges. After application of the multi-phase contour detection algorithm, the subject image is represented by a set of pixels that depicts the main contours of the boundaries thereof.

In order to perform affine correction, an oriented bounding box and the principle of the foreground contours is computed utilizing the affine rectification component 320. Subsequently, an affine transform is applied on all contours corresponding to transformation of the oriented bounding box to a rectangle (e.g., 200×200 pixel rectangle). This normalizes all images into one standard space definition.

For each edgel in the contour, the smoothed orientation (curvature) and two-sided contour colors are computed utilizing the orientation and sampling component 322. Basically, all the pixels on the boundary contours are analyzed and those that are most defining of the image are chosen as the pixels on which to build an edgel-based representation of the subject image. The contour colors are derived from the mean colors of the segments which the contour intersects, and are quantized into a particular color space, for instance, into 1 byte HSV values.

Contours above a threshold length are then stored as an edgel-based representation, for instance, in association with the edgel index 230 of FIG. 2. The contours are sub-sampled at high curvature and high gradient edgels are stored in the inverted edgel index (e.g., edgel index 230) utilizing the edgel index generation component 324. For performance, high frequency keys are removed from the index (similar to common words such as "is" in textual indices). In addition, the key values are stored in a cache-friendly layout.

The text index generation component 326 is configured to create a text index (e.g., textual index 234 of FIG. 2) by identifying any tags or text associated with the images from the image data store 312. Techniques for creating a textual index are known to those of ordinary skill in the art and, accordingly, are not further described herein.

Figure 4:
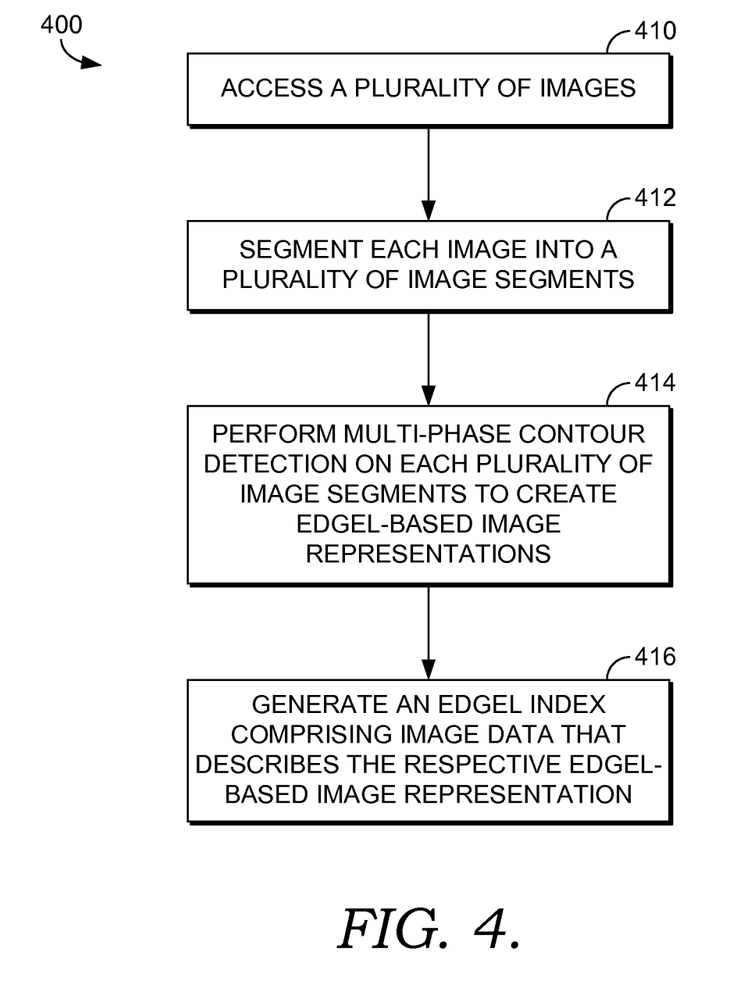
FIG. 4 is a flow diagram showing an exemplary method for generating an edgel (i.e., edge pixel) index, in accordance with an embodiment of the present invention.

With reference to FIG. 4, a flow diagram is illustrated showing an exemplary method 400 for generating an edgel (i.e., edge pixel) index, in accordance with an embodiment of the present invention. Initially, a plurality of images is accessed, as indicated at block 410. Each image in the plurality of images is segmented into a plurality of image segments, as indicated at block 412. A multi-phase contour detection is then performed on each respective plurality of segments to create an edgel-based representation of each of the plurality of images. This is indicated at block 414. An edgel index is then generated comprising image data that describes the respective edgel-based image representations, as indicated at block 416.

Returning to FIG. 2, and as previously set forth, the recall engine 226 is configured to utilize the color and orientation encoded shape-descriptors, including the edgels, from the salient contours of the visual query input as keys into the inverted edgel index 230. Thus, the shape-descriptors (including the edgels) in the visual query input are reordered to the same layout as described with reference to FIG. 3 by the query parser 224. A histogram with a number of bins equal to the number of images is computed and the score of each image is proportional to a number of matching shape descriptors (including the edgels).

The output from the query parser 224 is provided to the visual input matching component 228 which is configured to identify image data describing shape-descriptors, including edgel representations, that match or satisfy the input visual query. Thus, the illustrated visual input matching component 228 has access to the edgel (i.e., edge pixel) index 230. The textual input matching component 232 is configured to identify matching or satisfying search results based upon any textual input in the query. Accordingly, the illustrated textual input matching component 232 has access to the textual index 234.

The ranking engine 236 is configured to utilize the top k recalled candidates (for instance, the top k may equal approximately 2000 candidates at a maximum) and re-ranks them using, e.g., linear weighted oriented Euclidean chamfer plus color distance. The color distance for each pair of matching shape-descriptors is computed using the contour colors, using a perceptual distance metric in a particular color space, e.g., in HSV space. For queries having both textual and visual inputs, the normalized visual score is combined with the normalized text score.

In embodiments, in order to provide a high query throughput, the edgel index 230 is partitioned horizontally across multiple compute nodes, and within each node keys are distributed across multiple cores to improve recall performance. To improve ranking performance, the top k candidate set may be partitioned across multiple cores and each partition may be scored in parallel. Finally, to improve the query throughput, each compute node may maintain an object pool of multiple recall and ranking engines, and concurrent queries may be load balanced across the object pool. Any and all such variations, and any combination thereof, may be utilized consistent with embodiments of the present invention. Ranked results are subsequently transmitted for presentation to the user, for instance, in association with the display 218 of the client computing device 210.

In accordance with embodiments hereof, visual query refinements may be received and processed in a similar manner. That is, subsequent to receiving results of a query, a query refinement may be submitted that includes textual and/or visual input. To the extent the query refinement contains visual input, the visual input may be processed as described herein above with respect to FIGS. 2 and 3 to create an edgel-based representation thereof. In embodiments, other shape-descriptors, such as gradient-based representations and/or histograms of gradients may also be created. The edgel-based representation (and other shape-descriptors, where appropriate) may then be compared with the edgel-based representations (and other shape-descriptors, where appropriate) of the previously returned query results to identify those that more closely satisfy or match the received query refinement. Exemplary visual query refinements are illustrated with reference to FIGS. 7 and 8, more fully described below. In embodiments, the visual query refinement may be received via an incremental search suggestion interface through which search suggestions may be provided to the user based upon the query refinement input.

Figure 5:
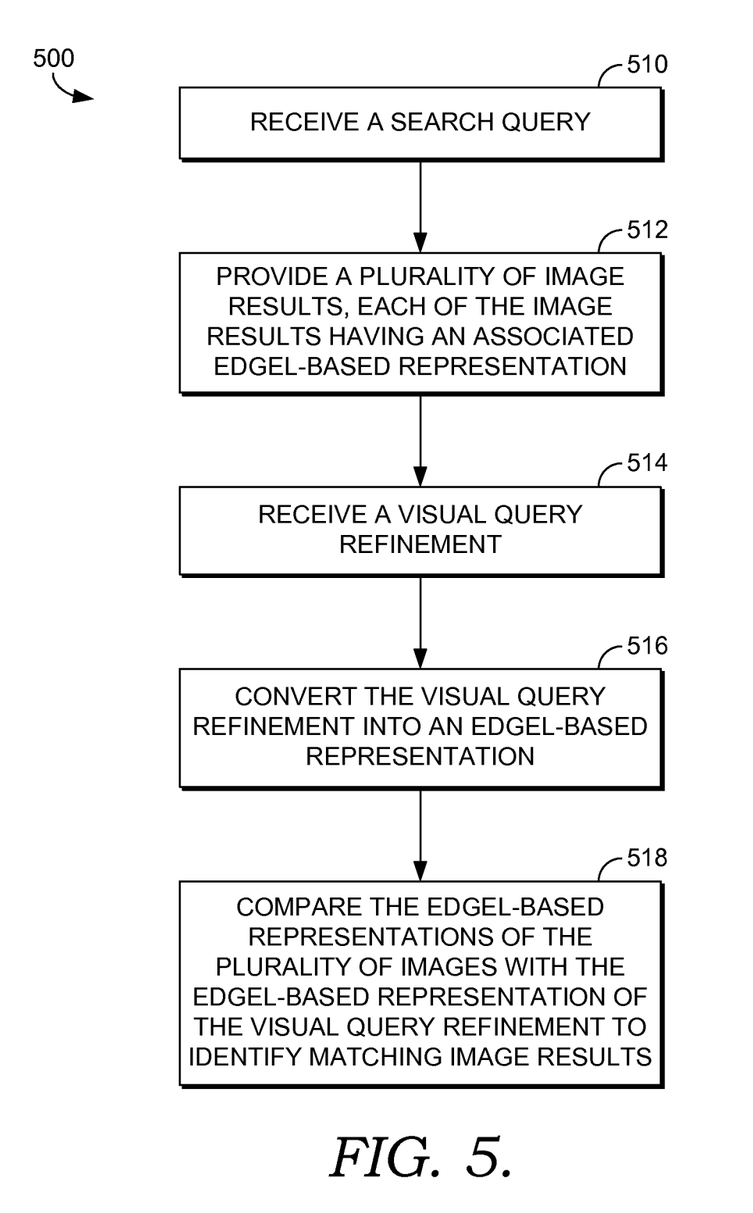
FIG. 5 is a flow diagram showing an exemplary method providing a unified system for web-scale visual search that is capable of using a combination of visual input modalities, such as a sketch, an image, and/or a collage, in accordance with an embodiment of the present invention.
Figure 6:
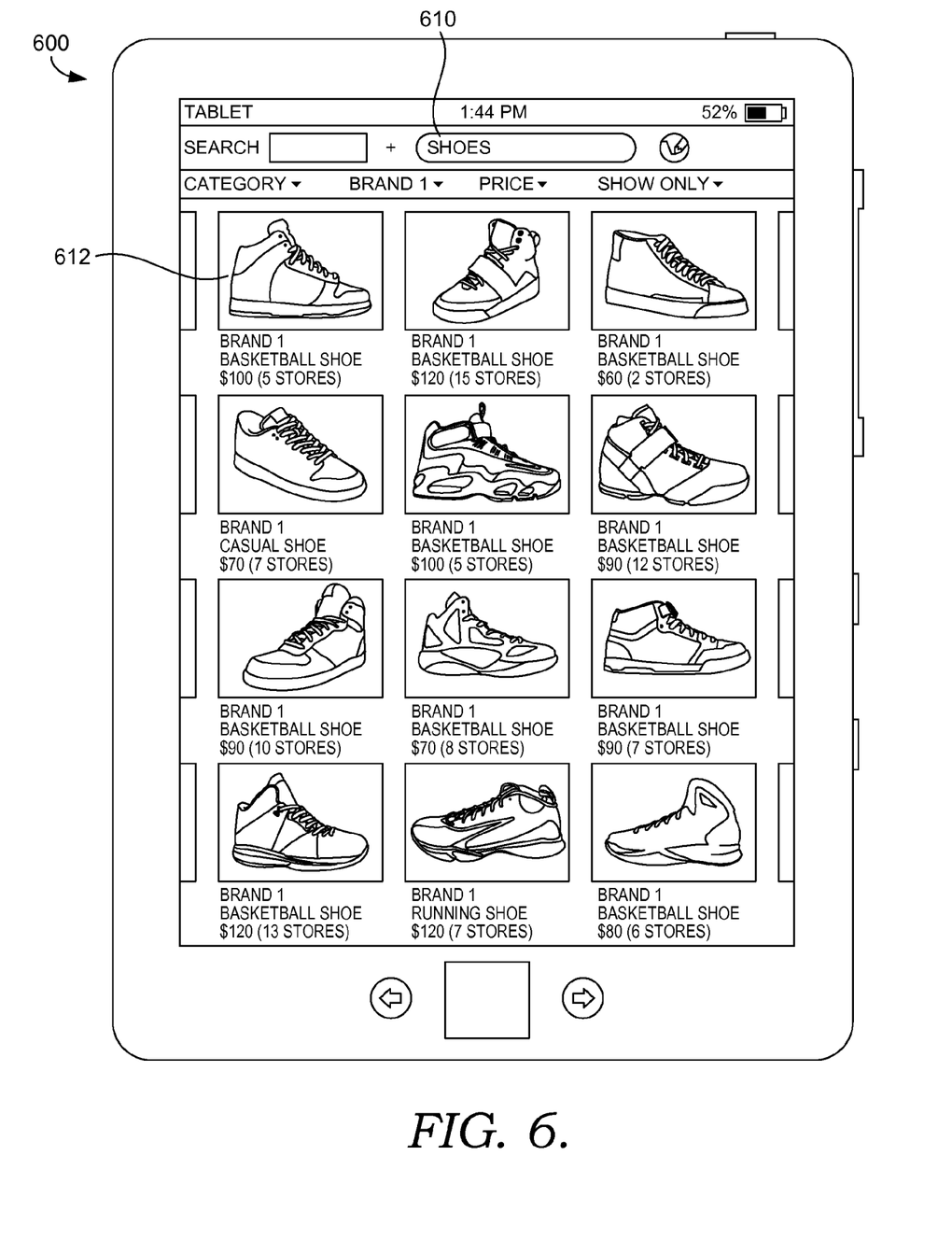
FIG. 6 is a schematic diagram showing an exemplary screen display of image search results presented based upon textual input, in accordance with an embodiment of the present invention.

Turning now to FIG. 5, a flow diagram is illustrated showing an exemplary method 500 for providing a unified system for web-scale visual search that is capable of using a combination of visual input modalities, such as a sketch, an image, and/or a collage, in accordance with an embodiment of the present invention. Initially, as indicated at block 510, a search query is received. The received search query may include textual and/or visual input. To the extent the search query includes visual input, such input may be provided, by way of example and not limitation, as one or more of images, sketches, and/or collages. In response to the search query, a plurality of image results is identified and provided for presentation, as indicated at block 512. By way of example, FIG. 6 is a schematic diagram illustrating an exemplary screen display 600 of results retrieved in response to a search in a shopping search vertical based upon textual input, in accordance with an embodiment of the present invention. As illustrated, the textual search query "shoes" was received via a textual search input box 610 and a plurality of visual (image) search results 612 was presented in response to the received search query. Each of the plurality of image results includes one or more associated shape-descriptors, including an associated edgel-based representation thereof, created in accordance with the methods and systems described herein above.

Returning to FIG. 5, a visual query refinement is received, as indicated at block 514. The visual query refinement may include, by way of example only, one or more of a sketch, an image, and/or a collage. This is indicated at block 516. The visual query refinement is converted into one or more shape-descriptors, including an edgel-based representation, utilizing methods and systems as described herein above. The shape-descriptors, including the edgel-based representation, of the plurality of image results is compared with the shape-descriptors, including the edgel-based representation, of the visual query refinement to identify at least one refinement-matching image of the plurality of image results. This is indicated at block 518. The at least one refinement-matching image is then transmitted for presentation to the user.

Figure 7:
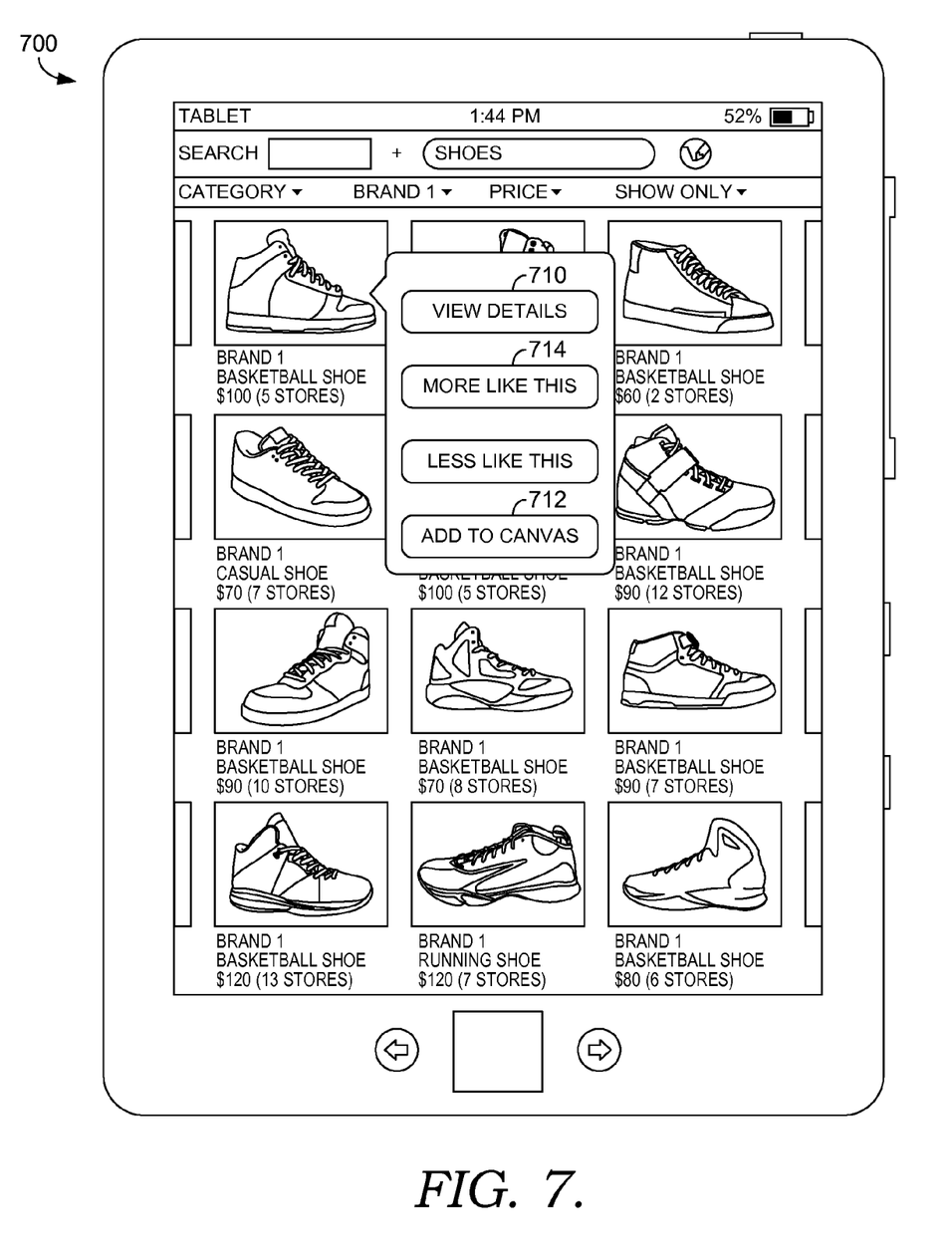
FIG. 7 is a schematic diagram showing an exemplary screen display of user selection of a particular image search result providing query refinement options, in accordance with an embodiment of the present invention.
Figure 8:
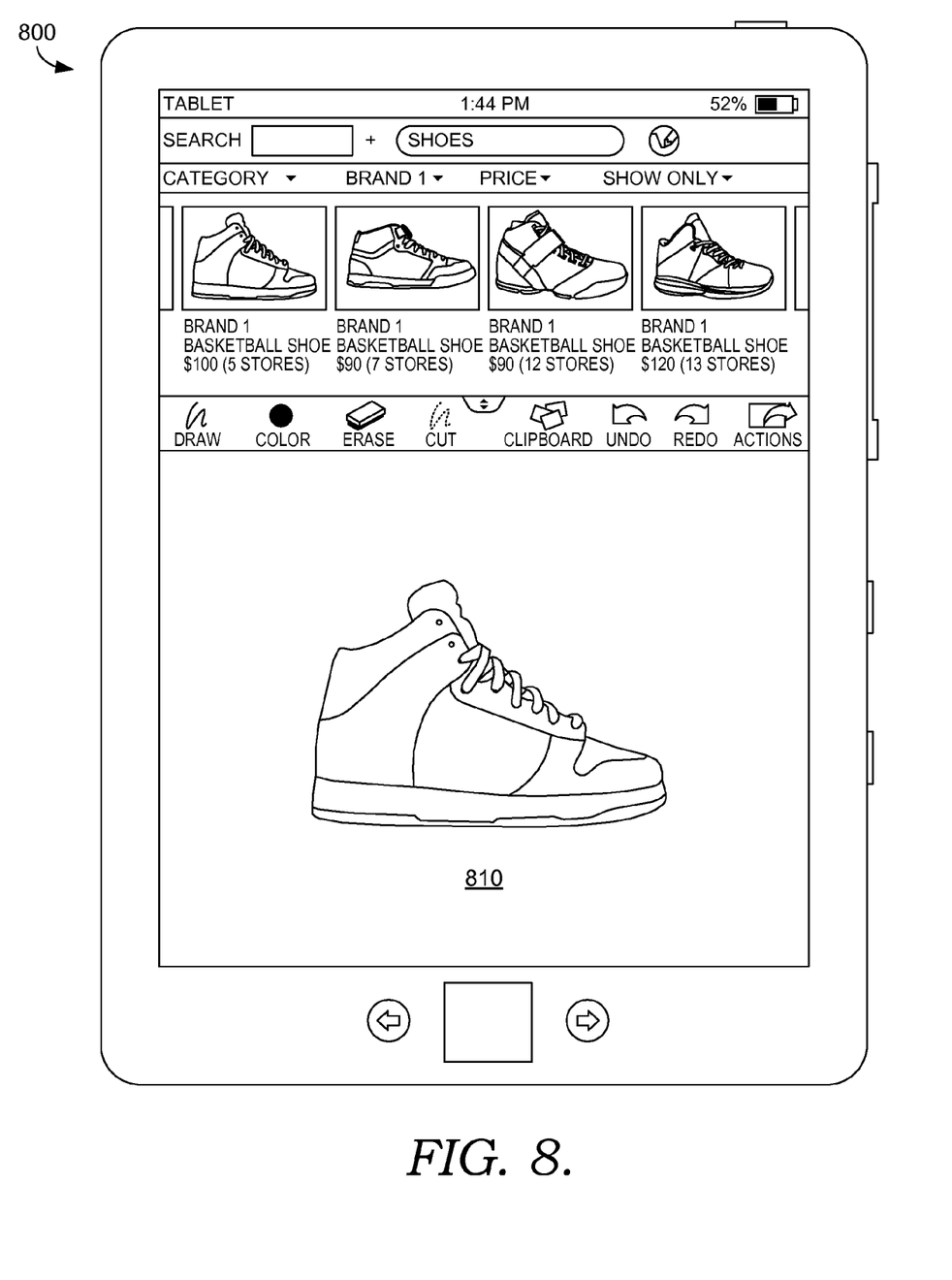
FIG. 8 is a schematic diagram showing an exemplary screen display of image search results refined and presented based upon an image input, in accordance with an embodiment of the present invention.
Figure 9:
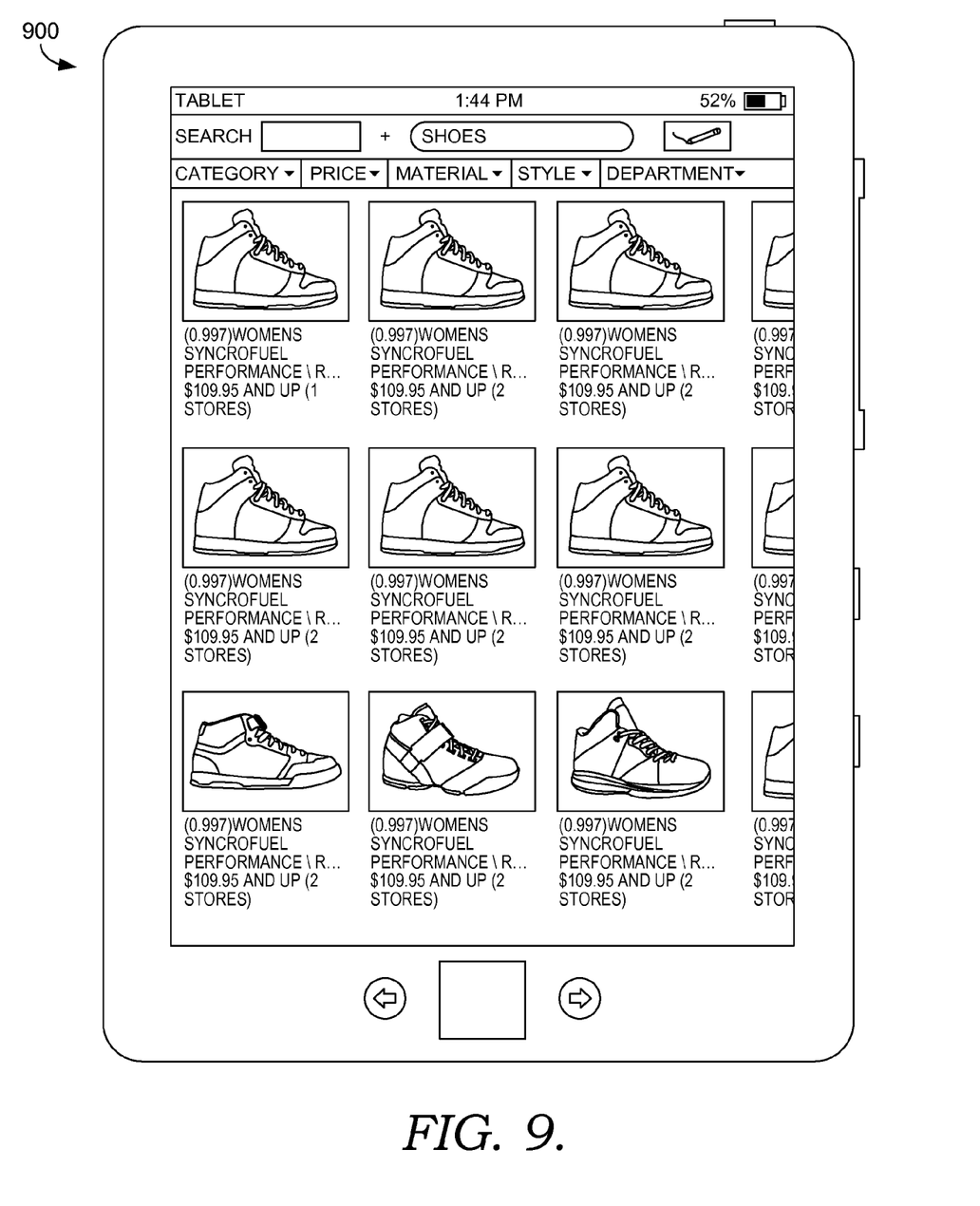
FIG. 9 is a schematic diagram showing an exemplary screen display of image search results refined and presented based upon image selection, in accordance with an embodiment of the present invention.

By way of example, FIGS. 7-9 are a schematic diagrams illustrating exemplary screen displays wherein an image of the plurality of image results presented in association with FIG. 6 is received as a visual query refinement. In the illustrated display 700, the user has selected, e.g., right-clicked on, the image search result shown in the top left of the display 600 of FIG. 6 causing presentation of a menu of actions items 710 that may be selected. Upon selection of the "Add to canvas" menu item 712, the image search result selected is copied onto a search canvas 810 as input for the visual query refinement, as shown in FIG. 8. Search results refined in accordance with the received visual query refinement are then provided in a horizontal scroll above the search canvas 810.

In another embodiment, upon selection of the "More like this" menu item 714, of the menu of action items 710 presented in FIG. 7, a display 900 of image search results refined in accordance with the selected visual query refinement is presented, as shown in FIG. 9.

Figure 10:
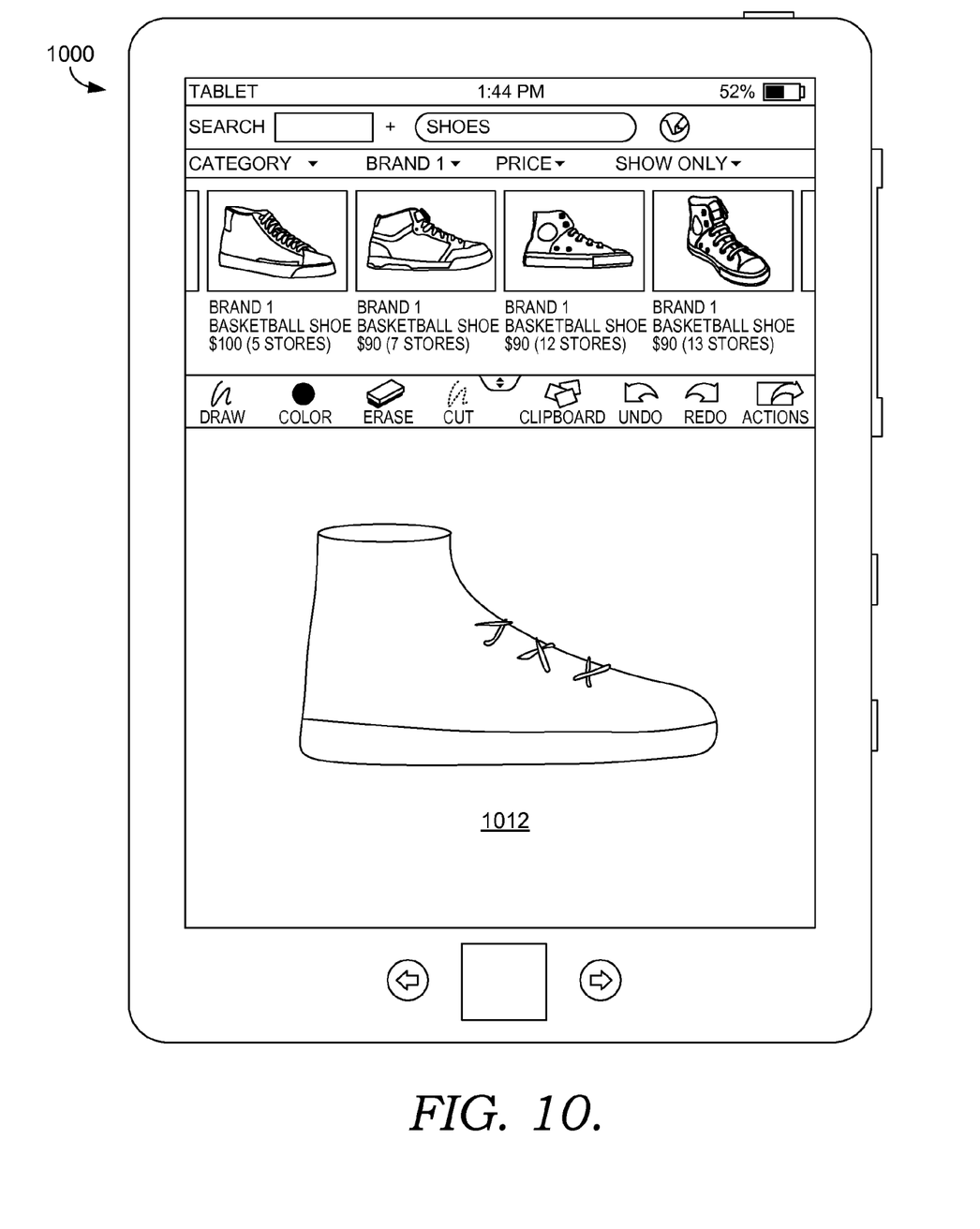
FIG. 10 is a schematic diagram showing an exemplary screen display of image search results presented or refined based upon a sketch input, in accordance with an embodiment of the present invention.

As previously set forth, a visual query input may be provided as the initial search query rather than a refinement. FIG. 10 is a schematic diagram illustrating an exemplary screen display 1000 wherein a sketch is utilized as a visual query input, in accordance with an embodiment of the present invention. In the illustrated display 1000, search results determined in accordance with the system and method herein described and based upon the received sketch are provided in a horizontal scroll above the search canvas 1010. Though not shown, in embodiments, the visual query may be received via an incremental search suggestion interface through which search suggestions may be provided to the user based upon the visual query input.

FIGS. 7-10 illustrate that a user interface in accordance with embodiments hereof is interactive and allows multiple ways to build an input that forms the search query input. Though not shown, the user interface also supports collage-based input for image search. The user interface may include the ability to draw freehand on the search canvas (810, 1010) using a touch input tool on a touch enabled device (e.g., a finger, stylus, or the like) and/or a mouse pointer. The user interface may also permit the drawing of parametric shapes such as quad-bezier curve based ovals, rectangles, and polygons using straight lines. As shown in FIG. 8, images from a display of search results may be used as input by dragging and dropping onto a search canvas (810, 1010). Pan, zoom and rotate operations may be provided via client scripting and transform operations, for instance, via CSS. The user interface may also allow a user to mix and match image and sketch inputs to form a collage effect for a specialized match from the indexed products. An example may be dragging a picture of an image of a shirt onto the canvas and then drawing a freeform cowboy hat north of the image, to search pictures of products that feature a model with a shirt similar to the one input and wearing a cowboy hat. The user interface may also permit erasing, undoing and redoing major interactions with the canvas, as desired. Any and all such variations, and any combination thereof, are contemplated to be within the scope of embodiments of the present invention.

Additionally, the availability of tags and text with many web images can also be leveraged to improve the accuracy of a search based on visual input. In some embodiments, a textual query may be used in conjunction with a visual input query to bridge the semantic gap between the visual query and a natural image when the visual query itself is insufficient to describe a user's query intention. For example, if a user draws a circle as his/her query to find the Moon, the system may return images containing many circular objects, but not necessarily the Moon. In this case, a text query submitted in conjunction with the sketch query can assist in improving the relevance of the search results.

As can be understood, embodiments of the present invention provide systems and methods for web-scale visual search that are capable of using a combination of visual input modalities. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 400 of FIG. 4 and the method 500 of FIG. 5 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A system comprising:
a processor in communication with computer-readable storage media;
an index maintained in the computer-readable storage media, the index comprising image data that describes one or more first shape-descriptors, including first edgel-based representations, of each of a plurality of images,
wherein the first edgel-based representations comprise a set of pixels that depict one or more boundary contours of each of the plurality of images and are created by segmenting each of the plurality of images into a plurality of image segments and performing a multi-phase contour detection on the plurality of image segments;
a query receiving component that receives a visual input as a search query;
a query parser that converts the visual input into at least one second shape-descriptor, including a second edgel-based representation,
wherein the second edgel-based representation comprises a set of pixels that depicts one or more boundary contours of the visual input and is created by segmenting the visual input into a plurality of visual input segments and performing a multi-phase contour detection on each of the visual input segments; and
a visual input matching component that matches the one or more first shape-descriptors, including the first edgel-based representations, of the plurality of images with the at least one second shape-descriptor, including the second edgel-based representation, of the visual input from the search query to identify at least one matching image of the plurality of images.

2. The system of claim 1, wherein the visual input is an image.

3. The system of claim 1, wherein the visual input is a sketch.

4. The system of claim 1, wherein the visual input is one or more of an image, a sketch, and a collage.

5. The system of claim 1, wherein the visual input matching component identifies multiple matching images of the plurality of images and wherein the visual input matching component further assigns a visual score to each of the multiple matching images.

6. The system of claim 5, further comprising a ranking engine that ranks the multiple matching images based, at least in part, upon the visual score respectively assigned to each.

7. The system of claim 1, wherein the index is constructed, at least in part, by segmenting each of the plurality of images into a respective plurality of segments, and performing a multi-phase contour detection on each respective plurality of segments.

8. The system of claim 7, wherein each segment of each respective plurality of segments is identified based upon at least one of color and gradient changes.

9. The system of claim 1, wherein the search query received by the query receiving component comprises visual input and textual input and wherein the query parser extracts the textual input from the visual input.

10. One or more computer-readable storage device having computer-executable instructions embodied thereon, that when executed by a computing system having a processor and memory, cause the computing system to perform a method comprising:
- receiving a search query;
- providing a plurality of image results, each of the plurality of image results having one or more associated shape-descriptors, including a first edgel-based representation thereof,
  - wherein the first edgel-based representation comprises a first set of pixels that depicts one or more first boundary contours of each of the plurality of image results and is created by segmenting each of the plurality of image results into a plurality of image result segments and performing a multi-phase contour detection on each of the plurality of image result segments;
- receiving a visual query refinement, wherein the visual query refinement comprises one or more of an image and a collage;
- converting the visual query refinement into at least one shape-descriptor, including a second edgel-based representation,
  - wherein the second edgel-based representation comprises a second set of pixels that depicts one or more second boundary contours of the visual query refinement and is created by segmenting the visual query refinement into a plurality visual query refinement segments and performing a multi-phase contour detection on each of the plurality of visual query refinement segments; and
- comparing the one or more shape-descriptors, including the first edgel-based representations of the plurality of images results with the at least one shape-descriptor, including the second edgel-based representation of the visual query refinement to identify at least one refinement-matching image of the plurality of image results.

11. The one or more computer-readable storage media of claim 10, wherein receiving a visual query refinement comprises receiving a sketch as the visual query refinement.

12. The one or more computer-readable storage media of claim 10, wherein receiving a visual query refinement comprises receiving an image as the visual query refinement.

13. The one or more computer-readable storage media of claim 10, wherein providing a plurality of image results comprises providing the plurality of image results via an incremental search suggestion interface, and wherein receiving a visual query refinement comprises receiving the visual query refinement via the incremental search suggestion interface.

14. The one or more computer-readable storage media of claim 10, wherein converting the visual query refinement into the at least one shape-descriptor, including the second edgel-based representation comprises, at least in part, segmenting the visual query refinement into a plurality of segments, and performing a multi-phase contour detection on the plurality of segments.

15. The one or more computer-readable storage media of claim 14, wherein each segment of the plurality of segments is identified based upon at least one of color and gradient changes.

16. A method comprising:
- accessing a plurality of images;
- segmenting each of the plurality of images into a respective plurality of segments;
- performing a multi-phase contour detection on each respective plurality of segments to create one or more shape-descriptors, including a first edgel-based representation, of each of the plurality of images, wherein the first edgel-based representation comprises a first set of pixels that depicts one or more first boundary contours of each of the plurality of segments; and
- generating, by a processor, an edgel index comprising image data that describes the respective one or more shape-descriptors, including the first edgel-based representations of each of the plurality of images;
- receiving a search query, the search query comprising a visual query input; converting the visual query input into at least one shape-descriptor, including a second edgel-based representation; and
- comparing the one or more shape-descriptors, including the first edgel-based representation, of each of the plurality of images with the at least one shape descriptor, including the second edgel-based representation, of the visual query input to identify at least one image of the plurality of images that matches the visual query input, wherein the second edgel-based representation comprises a second set of pixels that depicts one or more second boundary contours of the visual query input and is created by segmenting the visual query input into a plurality visual query input segments and performing a multi-phase contour detection on each of the plurality of visual query input segments.

17. The method of claim 16, wherein the visual query input is at least one of an image, a sketch, a collage, and any combination thereof.

* * * * *